United States Patent [19]
Dapo et al.

[11] Patent Number: 5,997,771
[45] Date of Patent: Dec. 7, 1999

[54] USE OF HYDROTROPIC AGENTS IN ELECTROLYTIC CAPACITORS

[75] Inventors: Roland F. Dapo, Columbia; James L. Stevens, Irmo, both of S.C.

[73] Assignee: BC Components Holdings B.V., Eindhoven, Netherlands

[21] Appl. No.: 09/212,627

[22] Filed: Dec. 16, 1998

[51] Int. Cl.$^6$ ............................... H01B 1/06; H01M 8/08
[52] U.S. Cl. ............................................. 252/500; 429/46
[58] Field of Search ........................... 252/62.2; 361/500, 361/503, 504, 505, 517; 429/195, 207, 46

[56] References Cited

U.S. PATENT DOCUMENTS 5,055,974  10/1991  Washio et al. ........................... 361/527

*Primary Examiner*—Mark Kopec
*Assistant Examiner*—Derrick G. Hamlin
*Attorney, Agent, or Firm*—Frishauf, Holtz, Goodman, Langer & Chick, P.C.

[57] ABSTRACT

An electrolytic solution is comprised of a borate, at least one dicarboxylic acid and at least one hydrotropic agent. The hydrotropic agent serves to maintain soluability at low temperatures, for example, in glycol type solvents. The invention also provides use of 1,10 dodecanedioic acid or dimer acid, thus improving the cost of the electrolyte is improved over use of branched chain dicarboxylic acids, while the use of the hydrotropic agent maintains solubility at acceptable temperatures.

8 Claims, 1 Drawing Sheet

USE OF HYDROTROPIC AGENTS IN ELECTROLYTIC CAPACITORS

BACKGROUND OF THE INVENTION

This invention pertains generally to the field of electrolytic capacitors ("elcaps") and specifically to the composition of the electrolyte used in elcaps.

The basic structure of an electrolytic capacitor is known. In an elementary form, a cylindrical container or can houses a "roll" comprised of a cathode foil, a first paper, an anode foil and a second paper. The first and second papers are porous separators which hold the fill electrolyte by capillary action. The papers and films are rolled onto the cathode foil; thus, the first and second papers separate the anode and cathode foils in the roll, while an end portion of the second paper is also interposed between the anode and the can. See FIG. 1. A tab connected to each of the anode and the cathode foils and projecting through the top of the can provide the electrodes.

An insulating oxide film is usually formed on the side of the anode facing the cathode. The electrolytic solution of the elcap is a conducting solution. Thus, the solution immediately adjacent the anode (on the cathode side of the anode) actually performs the function of the cathode. The oxide film forms a dielectric barrier between the anode and the electrolyte.

Accordingly, the characteristics of the elcap are determined in large part by the composition of the electrolyte. The conducting electrolytic solution is generally comprised of acid and salt. Prior efforts to improve the performance of elcaps, including reduction of the ESR, increasing the sparking voltage level, etc. have been directed at the composition of the electrolyte, among other things. Another important feature of the elcap, and thus the electrolyte, is its ability to perform over an acceptable range of temperatures. For example, an electrolyte that precipitates into solid particles at the low end of the operating range (such as room temperature), is usually unacceptable. Such characteristics can be related to the pH range of the solution; in many prior elcaps, the solution had to remain slightly basic in order to hold the acids together in the particular solvent.

In particular, maintaining the soluability of heavy dicarboxylic acid in glycol-like solutions containing borates has been difficult. The addition of borates to a composition having heavy dicarboxylic acids, even in a somewhat basic solution, results in the heavy acid separating from solution as a separate phase when it is standing at room temperature.

SUMMARY OF THE INVENTION

The present invention provides an electrolytic solution for use in an elcap that utilizes hydrotropic agents to maintain the soluability of heavy dicarboxylic acids in glycol-like solutions containing borates. The solutions remain as a single phase over an acceptable range of temperatures.

According to the invention, the salt or dicarboxylic acid used with the borate solution is adjusted to optimize the performance and reduce the cost. A 1,6 dodecanedioic acid may be used with the borate, its branched chain providing the requisite solubility over the temperature range. The branched chain dicarboxylic acids, like 1,6 dodecanedioic acid, however, are relatively expensive.

In order to reduce cost, a 1,10 dodecanedioic acid or dimer acid is used with the borate. While these straight chain acids are less expensive, these heavy dicarboxylic acids also tend to separate from solution as a separate phase, either solid or oil. To hold these solutions together in glycol type solvents (for example), the invention also provides a hydrotropic agent in the electrolyte. The hydrotropic agents can include 1-octanol, pelargonic acid and/or lauric acid. The solution need not be highly basic to hold these acids together in a glycol type solvent (for example). Thus, the less soluble ammonia salts of such acids may be used for solubility, rather than the amine salts.

Thus, the invention provides use of 1,10 dodecanedioic acid or dimer acid, thereby improving the cost of the electrolyte over use of a 1,6 dodecanedioic acid. When the 1,10 dodecanedioic acid or dimer acid is used, also according to the invention, a hydrotropic agent is provided in the electrolytic solution to maintain soluability over a satisfactory range.

DETAILED DESCRIPTION OF THE INVENTION

Figure 1:
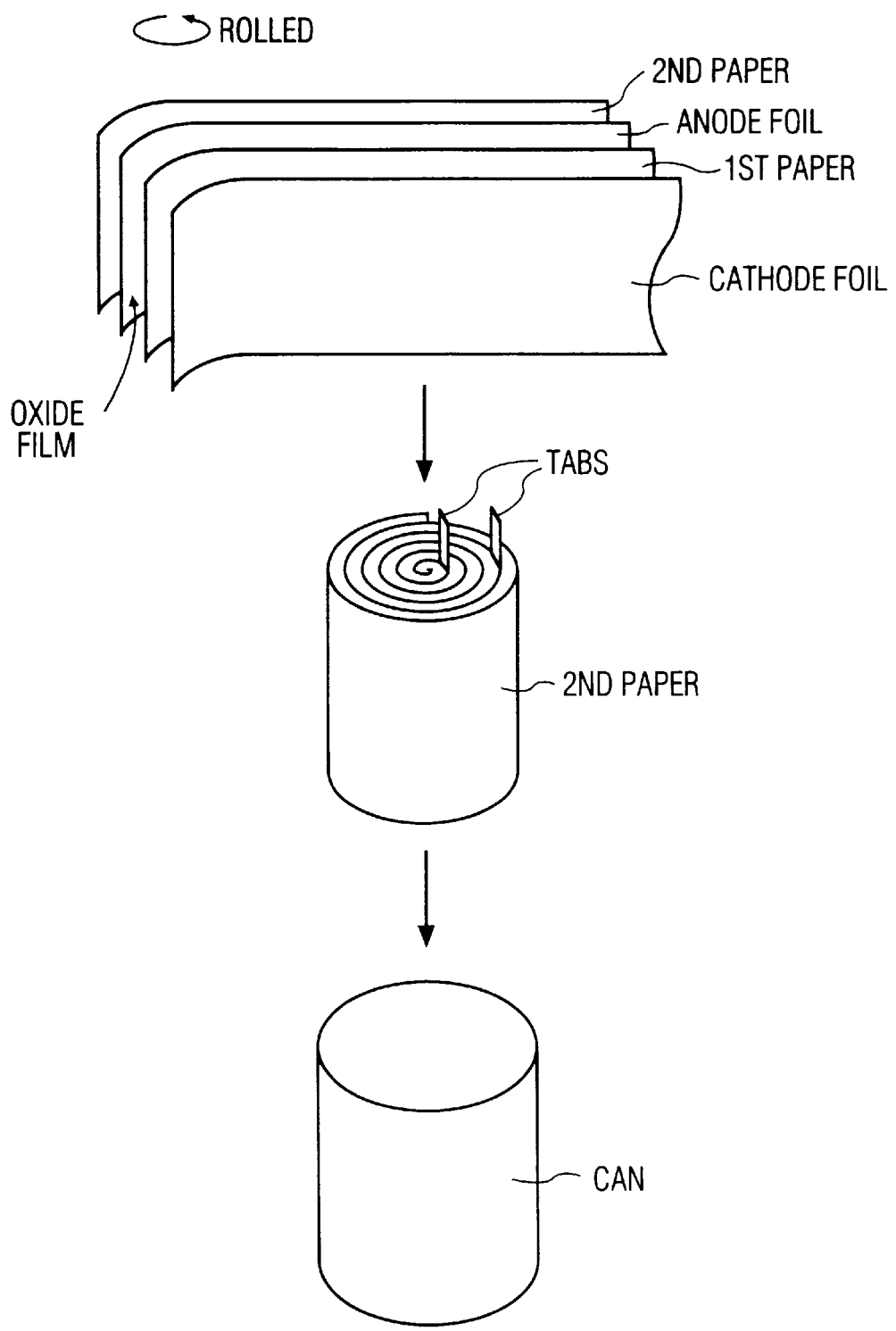
FIG. 1 is a known electrolytic capacitor, showing the constituents of the roll separated from the can.

An electrolytic solution of the present invention is comprised of ethylene glycol as the preferred solvent, for reasons related to safety and cost. As is known in the art, the solvent is the primary constituent of an electrolytic solution, often accounting for upwards of 80% to 90% by weight. Other glycols, such as diethylene glycol, or 2-methyl-1,3-propanediol are also preferred solvents.

A borate solution is used in the preferred embodiment of the invention. The percentage weight of the boric acid in the electrolyte is on the order of a fraction of one percent to a few percent. For example, a weight percentage in the range of approximately 0.10% to approximately 5.00% of boric acid is preferable. (Other borates, such as ammonium pentaborate or ammonium biborate, are also preferred constituents.) In the embodiments given below, mannitol is combined with the boric acid to form a complex acid.

The solution also includes a salt (or salts) of a dicarboxylic acid. Although a branched chain dicarboxylic acid (such as 1,6 dodecanedioic acid) gives an electrolyte that performs well, straight chain dicarboxylic acids, such as 1,10 dodecanedioic acid and dimer acid salts, are also preferred, because they are relatively inexpensive. A percentage weight of dicarboxylic acid in the range of approximately 0.05% to approximately 5.00% is preferable. The dimer acid may be comprised of mixed isomers. Carboxcyclic acids of higher molecular weight, such as Serbacic acid, may be substituted for the dicarboxcylic acid, provided it can tolerate the voltage application.

The invention also provides at least one hydrotropic agent as a constituent of the solution. The hydrotropic agent(s) serve to hold the various acids together over an operating range of temperatures in glycol type solvents. The use of the heavy dicarboxcylic acids, such as dodecanedioic and/or dimer acid, with a borate gives a solution that does not have to be highly basic to hold the acids together in a glycol type solvent. The apparent pH range may be in the range of about 6.00 to 8.00. Such a combination allows the use of the less soluble ammonia salts of the dicarboxylic acids, rather than amine salts, which can improve the solubility of such acids.

The preferred hydrotropic agents are lauric acid, n-octanol, and pelargonic acid. A percentage weight of lauric acid in the range of approximately 0.10% to approximately 5.00% is preferable. A percentage weight of n-octanol up to approximately 10.00% is preferable.

Other long chain alcohols (for example, C8 to C12) may also be used instead of n-octanol in the range given above. Other long chain monocarboxcylic acids (for example, C9 to C14) may be used instead of lauric acid. Other alternative hydrotropic agents include N,N-Diethyldodecanamide and N,N-(2-hydroxyethyl)-lauramide.

EXAMPLES

The following electrolytic solutions were used in experimental tests of a number of high volt aluminum elcaps, with the noted results.

Example 1

An electrolyte according to the present invention was made by adding the following constituents in the following amounts and in the order indicated while stirring:

| | | |
|---|---|---|
| Ethylene Glycol | 90.00 | wt % |
| Lauric Acid | 0.75 | |
| Boric Acid | 0.75 | |
| Dimer Acid | 0.50 | |
| di Water | 1.00 | |
| Ammonium Hydroxide | 1.00 | |
| Mannitol | 2.50 | |
| 1-octanol | 2.50 | |
| 0-Nitroanisole | 1.00 | |

Before the 1-octanol was added, it was first mixed and heated to 75° C. The resistivity of the electrolyte was measured as 1500 ohm.cm at 25° C. and 1256 ohm.cm at 30° C., and the apparent pH was 7.51. The electrolyte had good solubility at low temperature: It did not separate into different phases on standing at room temperature and, in fact, remained clear and without separation of phases when cooled to -30° C.

At approximately -35° C., a small amount of 1-octanol was observed to separate as a solid phase. However, if the 1-octanol and lauric acid were omitted and the ammonium hydroxide concentration were adjusted to the same pH, the electrolyte would separate into an oil, dimer acid and glycol phases on standing at room temperature.

It is also noted that the electrolye was life tested in a number of capacitors. 600 WV capacitors were made having a 840 Vf anode and using this electrolyte. The capacitors were aged to a final voltage of 625 V at 75° C. Life tests of 12 such elcaps demonstrated that the electrolyte was suitable for a 105° C./550 V rated capacitor operation and had a superior lifetime.

Example 2

An electrolyte according to the present invention was made by adding the following constituents in the following amounts and in the order indicated while stirring:

| | | |
|---|---|---|
| Ethylene Glycol | 87.00 | wt % |
| 1-octanol | 2.25 | |
| Dimer Acid | 0.50 | |
| 1,10 Dodecanedioic Acid | 1.75 | |
| Lauric Acid | 1.75 | |
| Boric Acid | 0.75 | |
| Ammonium Hydroxide | 2.00 | |
| Mannitol | 3.00 | |
| 0-Nitroanisole | 1.00 | |

Before the 0-Nitroanisole was added, it was first mixed and heated to 750°C. to dissolve solids. The resistivity of the electrolyte was measured as 835 ohm.cm at 25° C. and 700 ohm.cm at 30° C., and the apparent pH was 7.15. The electrolyte had good solubility at low temperature: It did not separate into different phases on standing at room temperature and remained clear and without separation of phases when cooled to approximately -35° C.

At approximately -35°C., the 1-octanol was observed to form a solid phase separate from the other components. (However, the 1-octanol re-dissolved when warmed back to room temperature, thus the composition remains a homogenous solution over a wide temperature range.) If the 1-octanol and lauric acid were omitted and the ammonium hydroxide concentration were adjusted to the same pH, the electrolyte would separate into an oil, dimer acid, and glycol phases on standing at room temperature.

It is also noted that the electrolye was life tested in a number of capacitors. 450 WV capacitors were made having a 700 Vf anode and using this electrolyte. The capacitors were aged to a final voltage of 520 V at 75° C. Life tests of 12 such elcaps demonstrated that the electrolyte was suitable for a 95° C./450 V rating and had a superior lifetime.

Example 3

An electrolyte according to the present invention were made using electrolyte made by adding the following constituents in the following amounts and in the order indicated while stirring:

| | | |
|---|---|---|
| Ethylene Glycol | 83.00 | wt % |
| Dimer Acid | 0.50 | |
| 1,10 Dodecanedioic Acid | 5.25 | |
| Lauric Acid | 1.50 | |
| Boric Acid | 0.75 | |
| Dimethylamine | 3.00 | |
| Mannitol | 3.00 | |
| di Water | 2.00 | |
| 0-Nitroanisole | 1.00 | |

Before the 0-Nitroanisole was added, the mix was heated to 85°C. to dissolve solids. The resistivity of the electrolyte was measured as 535 ohm.cm at 25° C. and 445 ohm.cm at 30° C., and the apparent pH was 7.71. The electrolyte had good solubility at low temperature: It did not separate into different phases on standing at room temperature and remained without separation of phases when cooled to approximately -40° C. Thus, the high molecular weight dicarboxylic acid salts were kept in solution even in the presence of a borate anion species.

If the lauric acid was omitted and an ammonium hydroxide concentration were adjusted to the same pH, the electrolyte would separate into an oil, dimer acid, and glycol phases on standing at room temperature.

It is also noted that the electrolye was life tested in a number of capacitors. 300 WV capacitors were made having a 490 Vf anode and using this electrolyte. The capacitors were aged to a final voltage of 340 V at 75° C. Life tests of 12 such elcaps demonstrated that the electrolyte was suitable for a 115°C./300 V rating and maintained soluability during operation over a superior lifetime.

Apart from the alternative constituents to the electrolyte suggested above up to 10.0 wt % water may be used. In order to create a apparent pH in the preferred range of approximately 6.25 to approximately 8.50, preferred base constituents include ammonia or dimethylamine. Other additives may include depolarizers or other chemicals that can modify the properties to meet other performance requirements.

It will be understood that various modifications can be made to the various embodiments of the present invention herein disclosed without departing from its spirit and scope. For example, many electrolytes other than those having the chemical composition given in the examples are contemplated. Therefore the above description should not be construed as limiting the invention but merely as presenting preferred embodiments of the invention. Those skilled in the art will envision other modifications within the spirit and scope of the present invention as defined by the claims presented below.

What is claimed is:

1. An electrolyte for an electrolytic capacitor comprising a borate solution, at least one dicarboxylic acid and a hydrotropic agent.

2. An electrolyte as claimed in claim 1, wherein the dicarboxylic acid is comprised of a straight chain dicarboxylic acid.

3. An electrolyte as claimed in claim 2, wherein the straight chain dicarboxcylic acid is comprised of 1,10 dodecanedioic acid.

4. An electrolyte as claimed in claim 2, wherein the straight chain dicarboxcylic acid is comprised of dimer acid salt.

5. An electrolyte as claimed in claim 1, the at least one hydrotropic agent being selected from the group of lauric acid, n-octanol, pelargonic acid, N,N-Diethyldodecanamide and N,N-(2-hydroxyethyl)-laurarnide.

6. An electrolyte as claimed in claim 1, the at least one hydrotropic agent being, a long chain alcohol.

7. An electrolyte as claimed in claim 1, the at least one hydrotropic agent being a long chain monocarboxcyclic acid.

8. An electrolyte as claimed in claim 1, wherein the solution is also comprised of a glycol type solvent.

* * * * *